United States Patent
Yelland

[11] 3,926,942
[45] Dec. 16, 1975

[54] METALLIZED FORMAZAN COMPOUNDS CONTAINING A REACTIVE GROUP

[75] Inventor: Michael Yelland, Manchester, England

[73] Assignee: Imperial Chemical Industries Limited, London, England

[22] Filed: Aug. 13, 1973

[21] Appl. No.: 387,727

[30] Foreign Application Priority Data
Aug. 31, 1972 United Kingdom............. 40320/72

[52] U.S. Cl.......... 260/146 T; 260/146 D; 260/149; 260/153; 260/192; 260/193
[51] Int. Cl.² ............... C09B 62/08; D06P 1/382; C09B 62/24
[58] Field of Search............. 260/153, 146 T, 146 D

[56] References Cited
UNITED STATES PATENTS

| | | | |
|---|---|---|---|
| 3,068,217 | 12/1962 | Beffa et al. | 260/153 X |
| 3,202,650 | 8/1965 | Steinemann | 260/153 X |
| 3,362,948 | 1/1968 | Andrew et al. | 260/153 X |

Primary Examiner—Floyd D. Higel
Assistant Examiner—C. F. Warren
Attorney, Agent, or Firm—Cushman, Darby & Cushman

[57] ABSTRACT

Dyestuffs represented by the general formula:

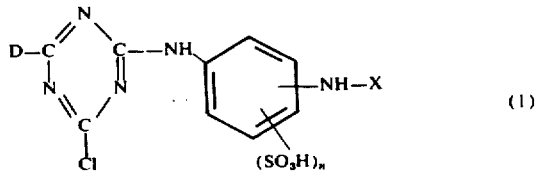

wherein D is the N-linked radical of a metal complex formazan compound containing a single amino group, $n$ is 1 or 2, and X is the residue of a colorless organic acid containing a cellulose-reactive substituent. These compounds provide bright blue or green shades on cellulose textile materials of good fastness to washing or to light. They are notable for the high proportion which fixes on the fibre and for the low degree of staining of adjacent undyed material in washing.

6 Claims, No Drawings

METALLIZED FORMAZAN COMPOUNDS CONTAINING A REACTIVE GROUP

This invention relates to new reactive dyestuffs primarily valuable for the coloring of cellulose textile materials.

According to the invention there are provided dyestuffs represented by the general formula:

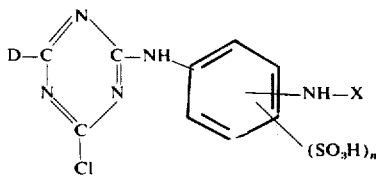

wherein D is the N-linked radical of a metal complex formazan compound containing a single amino group, $n$ is 1 or 2, and X is the residue of a colorless organic acid containing a cellulose-reactive substituent.

Preferably D represents a radical of the formula:

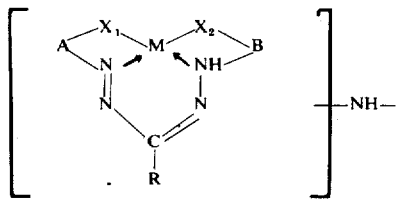

wherein A and B are o-phenylene or o-naphthylene radicals, one of $X_1$ and $X_2$ is O and the other is $CO_2$, M is Cu, Ni, Co or Cr, R is an aliphatic radical of 1 to 4 carbon atoms, or a phenyl or furyl radical, the NH group is attached to a benzene or naphthalene nucleus in A, B or R and the radical contains 1 to 3 sulphonic acid groups.

The radicals A and B can, for example, contain —NH—, $NO_2$, Cl, $NHCOCH_3$, $SO_2NH_2$ or $SO_3H$ as substituents. The radical R when aliphatic can represent an alkyl or alkenyl radical of 1 to 4 carbon atoms and when phenyl can contain, for example, —NH—, $NO_2$, $CH_3$, Cl, $OCH_3$ or $SO_3H$ as substituents. Preferably M is Cu.

The preferred dyestuffs are those wherein M is Cu, $X_1$ is O and $X_2$ is $CO_2$ and either A, B and R are each a benzene radical, bearing only $SO_3H$ groups or possibly a Cl atom in addition to $X_1$, $X_2$ and the NH radical, or A is a sulphonated naphthylene radical, the other sybmols having the meaning just stated.

As examples of groups represented by X there may be mentioned aliphatic sulphonyl groups which contain a halogen atom or sulphate ester group in β-position to the sulphur atom, e.g. β-sulphatoethylsulphone, α,β-unsaturated acyl radicals of aliphatic carboxylic acids for example, acrylic acid, α-chloroacrylic acid, propiolic acid, maleic acid and mono- and di-chloromaleic acids; also the acyl radicals of acids which contain a substituent which reacts with cellulose in the presence of an alkali, e.g. the radical of a halogenated aliphatic acid such as chloroacetic acid, β-chloro and β-bromopropionic acids and α,β-dichloro- and dibromo-propionic acids. Other examples are tetrafluoro cyclo butane carbonyl, trifluorocyclo butene carbonyl, tetrafluorocyclobutyl ethenyl carbonyl, trifluorocyclobuteneethenyl carbonyl and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example 2:3-dichloro-quinoxaline-5- or -6-sulphonyl, 2:3-dichloro-quinoxaline-5- or -6-carbonyl, 2:4-dichloro-quinazoline-6- or -7-sulphonyl, 2:4:6-trichloro-quinazoline-7- or 8-sulphonyl, 2:4:7- or 2:4:8-trichloro-quinazoline-6-sulphonyl, 2:4-dichloro-quinazlline-6-carbonyl, 1:4-dichloro-phthalazine-6-carbonyl, 4:5-dichloro-pyridazon-1-yl, 2:4-dichloro-pyrimidine-5-carbonyl, 1-(phenyl-4-carbonyl)-4:5-dichloro-pyridazone, 1-(phenyl-4-sulphonyl)-4:5-dichloro-pyridazone, and, more particularly s-triazin-2-yl and pyrimidin-2-yl or -4-yl radicals which contain on at least one of the remaining 2,4- and 6-positions a bromine, or preferably, a chlorine atom, a sulphonic acid group, a thiocyano group, an aryloxy or arylthio group containing an electronegative substituent such as sulphophenoxy, sulphophenylthio, nitrosulphophenoxy, disulphophenoxy and sulphonaphthoxy, or a group of the formula:

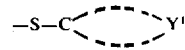

wherein $Y^1$ represents a group of atoms necessary to form a 5- or 6-membered heterocyclic ring which may carry substituents or form part of a fused ring system; or a quaternary ammonium or pyridinium group; or a group of the formula:

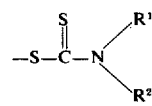

wherein $R^1$ and $R^2$ each represents the same or different alkyl, cycloalkyl, aryl or aralkyl group, or $R^1$ and $R^2$ together form, together with the nitrogen atom, a 5- or 6-membered heterocyclic ring; or a group of the formula:

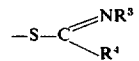

wherein $R^3$ and $R^4$ may be the same or different and each represents a hydrogen atom or an alkyl, aryl, or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye. As examples of such substituents, there may be mentioned, for example, primary amino and hydroxyl groups, also mono- or di-substituted amino groups, etherified hydroxyl and etherified mercapto groups; in the case of substituted amino groups this class includes, for example, mono- and dialkylamino groups in which the alkyl group preferably contains at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight, i.e., having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, β-chloroethylamino, cyclohexylamino, anilino, sulphophenylamino, disulphophenylamino, N-methylsulphophenylamino, N-β-hydroxyethylsulphophenylamino, sulpho-o-tolylamino, carboxyphenylamino and sulphocarboxyphenylamino, methoxy, ethoxy, and butoxy, phenoxy, methylphenoxy, chlorophenoxy and phenylthio groups. Chlorine atoms or cyano, nitro, carboxy and carbalkoxy groups in the 5-position of a pyrimidyl radical come into the category of non-reactive substituents.

Preferably, X is one of the following: β-sulphatoethyl sulphonyl, 2,4-dichloropyrimid-6-yl, 2,4,5-trichloropyrimid-6-yl, 2,4-dichloropyrimid-5-ylcarbonyl, 2,3-dichloroquinoxalin-6-ylcarbonyl, β-chloropropionyl or

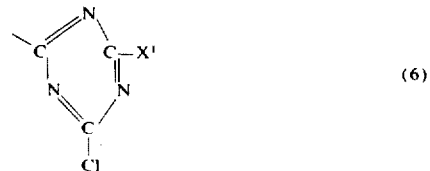
(6)

in which $X^1$ is Cl, $OCH_3$, $OCH(CH_3)_2$, $NH_2$,

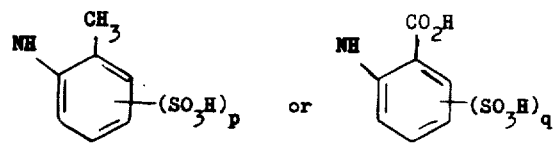

(7)　　　　　(8)　　　　　(9)

in which $m$ is 0, 1 or 2; $p$ is 1 or 2; and $q$ is 0 or 1.

Thus, especially preferred are the dyes of the formula:

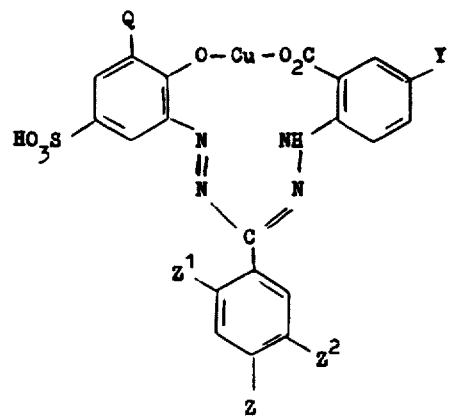

(10)

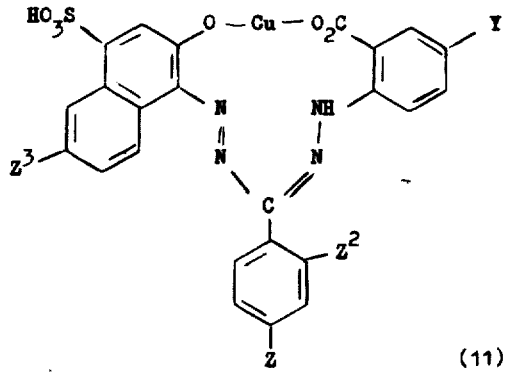

(11)

wherein one of Q, Y and Z is a cellulose-reactive group of the formula:

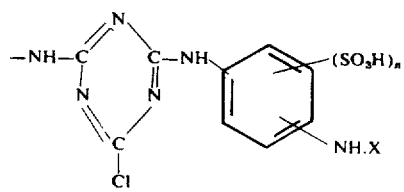

(12)

Q otherwise being H, Cl or SO₃H,
Y otherwise being SO₃H,
Z otherwise being H or SO₃H,
Z¹ is H, Cl or SO₃H,
Z² is H or SO₃H, and
Z³ is H or SO₃H,
the symbols n and X having the meanings stated above.

The invention also provides a process for the manufacture of the new dyestuffs which comprises reacting an amine of the formula:

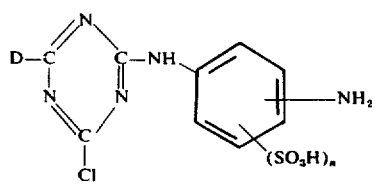

(13)

wherein D and n have the meanings stated above with the acid chloride or anhydride of a colorless acid containing a cellulose-reactive substituent.

The above process can be conveniently carried out by stirring the reactants in aqueous medium at a temperature from 0° to 80°C, preferably maintaining the pH of the medium at from 5 to 7.

As examples of halides or anhydrides of colorless acids which may be used, there may be mentioned, for example, carbyl sulphate and the anhydrides or acid halides of α:β-unsaturated aliphatic acids such as chloromaleic anhydride, propiolyl chloride and acrylyl chloride, the acid chlorides of halogenated aliphatic acids such as chloroacetyl chloride, sulphochloroacetyl chloride, β-bromo and β-chloro-propionyl chloride and α:β-dichloro- and dibromo-propionyl chlorides, 2,2,3,3-tetrafluorocyclobutane carbonyl chloride, β-(2,2,3,3-tetrafluorocyclobutyl)acrylyl chloride, 2,3,3-trifluorocyclobut-1-ene carbonyl chloride, β-(2,3,3-trifluoro cyclobut-1-eny)acrylyl chloride, and heterocyclic compounds which contain at least 2 nitrogen atoms in the heterocyclic rings and which contain 2 or more halogen, especially chlorine, atoms in the ortho positions to the nitrogen atoms, such as 2:3-dichloroquinoxaline-5- or 6-carbonyl chlorides, 2:3-dichloro-quinoxaline-5- and 6-sulphonyl chlorides, 2:4-dichloro-quinazoline-6- and 7-sulphonyl chlorides, 2:4:6-trichloro-quinazoline-7- and 8-sulphonyl chlorides, 2:4:7- and 2:4:8-trichloro-quinazoline-6-sulphonyl chlorides, 2:4-dichloro-quinazoline-6-carbonyl chloride, 1:4-dichloro-phthalazine-6-carbonyl chloride, 2:4-dichloro-pyrimidine-5-carbonyl chloride, β-(4:5-dichloropyridazonyl-1-)propionyl chloride, 1-(4'-chloro-formyl-phenyl)-4:5-dichloro-6-pyridazone, 1-4'-chlorosulphonylphenyl-4:5-dichloro-6-pyridazone, 2:4:6-tribromo- and trichloro-pyrimidines, 2:4:5:6-tetrachloropyrimidine, 5-methyl-2:4:6-trichloropyrimidine, 5-nitro-2,4:6-trichloropyrimidine, 2:4-dichloro-5-nitro-6-methylpyrimidine, 2:4-dichloro-5-nitropyrimidine, 2:4:6-trichloro-5-cyanopyrimidine, 5-ethoxycarbonyl-2:4-dichloropyrimidine, 2:4-dichloropyrimidine-5-carbonyl chloride, cyanuric bromide, cyanuric chloride; the primary condensation products of cyanuric bromide or cyanuric chloride with ammonia, an alkali metal sulphite or thiocyanate or a colorless organic mercaptan, hydroxy compound or primary or secondary amine, for example methanol, ethanol, isopropanol, phenol, o-, m- and p-chlorophenols, o-, m- and p-cresols, o-, m- and p-sulphophenols, thiophenol, thioglycollic acid, di-methyldithiocarbamic acid, mercaptobenzthiazole, thioacetamide, methyl-, dimethyl-, ethyl-, diethyl-, n-propyl, isopropyl-, butyl-, hexyl- and cyclohexylamines, toluidine, piperidine, morpholine, methoxyethylamine, ethanolamine, aminoacetic acid, aniline-2:4-, 2:5- and 3:5-disulphonic acids, orthanilic, metanilic and sulphanilic acids, 2-, 3- and 4-aminobenzoic acids, 4- and 5-sulpho-2-aminobenzoic acids, 4- and 5-sulpho-o-toluidines, 5-amino-2-hydroxybenzoic acid, 2-amino-ethanesulphonic acid, aminonaphthalene mono- and disulphonic acids and N-methylaminoethane sulphonic acid; also, the secondary condensation products of cyanuric chloride with alkali metal sulphites, alkali metal thiocyanates, phenols and thiophenols containing an electronegative substituent, and compounds of the formulae:

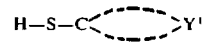

(14)

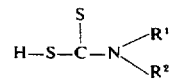

(15)

and

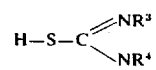

(16)

wherein Y¹, R¹, R², R³ and R⁴ have the meanings stated above. The amines of formula (13) can themselves be obtained by condensing together equimolecular proportions of cyanuric chloride, a phenylene diamine mono- or di-sulphonic acid and a metal complex formazan compound containing a single amino group.

As examples of phenylene diamine mono- and di-sulphonic acids which may be used, there may be mentioned: 1,4-diaminobenzene-2-sulphonic and -2,5-disulphonic acids, 1,3-diaminobenzene-4-sulphonic and -4,6-disulphonic acids.

As examples of formazan compounds which may be used, there may be mentioned, the compounds of the formula:

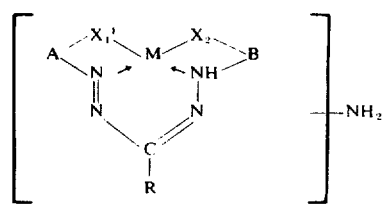

(17)

wherein the symbols R, A, B, X₁, X₂ and M have the meanings stated above.

These compounds may be obtained, e.g.

a. by coupling a diazotized o-aminophenol or o-aminonaphthol with an o-carboxyphenyl or naphthyl hydrazone of an aldehyde of formula R-CHO, one of these reactants containing a single nitro or acylamino group, forming the metal complex and hydrolyzing the acylamino or reducing the nitro group to amino.

b. by utilising the same reactants as in (a) but forming the metal complex of the hydrazone first, coupling this with the diazotized aminophenol or aminonaphthol and then hydrolyzing or reducing as necessary to form the amino group.

As examples of o-aminophenols or o-aminonaphthols which may be used in the above processes, there may be mentioned:

o-aminophenol
o-aminophenol-4-sulphonic and -4,6-disulphonic acids,
6-chloro-, 6-nitro- and 6-acetylaminophenol-4-sulphonic acids,
4-chloro-, 4-nitro- and 4-acetylaminophenol-6-sulphonic acids,
1-amino-2-naphthol-4-sulphonic acid,
6-nitro-1-amino-2-naphthol-4-sulphonic acid,
6-acetylamino-1-amino-2-naphthol-4-sulphonic acid, and
6-acetylamino-2-amino-1-naphthol-4,8-disulphonic acid.

As examples of aldehydes which may be used there may be mentioned:
acetaldehyde,
propionaldehyde,
n- and i-butyraldehyde,
crotonaldehyde,
furfuraldehyde,
benzaldehyde,
2- and 4-methylbenzaldehyde,
m- and p-methoxybenzaldehyde,
benzaldehyde-2-, 3- and 4-sulphonic and -2,4-disulphonic acids,
4-amino-2-sulphobenzaldehyde
m- and p-acetylaminobenzaldehydes,
2- and 4-chlorobenzaldehydes,
2-chloro-5-sulphobenzaldehyde,
2-chloro-4, 5- and 6-nitrobenzaldehydes,
2,5- and 2,6-dichloro-benzaldehydes,
2,6-dichloro-3-methoxy and 3-nitrobenzaldehydes,
3-methyl-2- and 6-nitrobenzaldehydes,
o- and m-nitrobenzaldehydes,
salicylaldehyde,
2,3,6-trichlorobenzaldehyde.

As examples of phenyl or naphthyl-hydrazines which may be used, there may be mentioned:
2-carboxyphenylhydrazine,
4- and 5-sulpho-2-carboxyphenylhydrazines,
4-nitro-2,5-dicarboxyphenylhydrazine,
4- and 5-chloro-2-carboxyphenylhydrazines,
2-carboxy-3-naphthylhydrazine,
4-, 5- and 6-nitro-2-carboxyphenylhydrazines,
4- and 5-acetylamino-2-carboxyphenylhydrazines,
5-methoxy-2-carboxyphenylhydrazine,
2,5-dicarboxyphenylhydrazine.

As examples of metal-yielding agents which may be used for forming the metal complexes, there may be mentioned:
copper sulphate,
copper acetate,
nickel sulphate,
chromium acetate,
cobalt chloride.

The invention also provides a process for manufacture of the new dyestuffs which comprises reacting cyanuric chloride with one mole of a metal complex form-azan compound containing a single amino group and one mole of a colorless amine of formula:

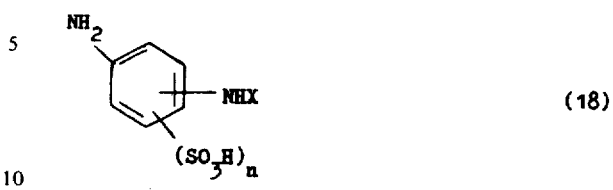

the symbols n and X having the meanings stated above.

This process can conveniently be carried out by stirring the reactants in aqueous medium at a pH of 5 to 7, adding an acid binding agent to neutralize the hydrochloric acid liberated during the reaction. For replacement of the first chlorine atom it is preferred to carry out the reaction at 0°–20°C and for replacement of the second chlorine atom it is preferred to use a temperature of 30°–50°C. In many cases it is possible to react with the two amines in either order, but if n in the compound of formula (18) is 2 or in the cases where X represents a dichloro-s-triazine group it is preferable to react the cyanuric chloride first with the amine of formula (18) and then react the product with the metal complex formazan compound.

The amines of formula (18) can themselves be obtained by reaction of a phenylene diamine mono- or di-sulphonic acid with one molecular proportion of the acid chloride or anhydride of a colorless organic acid containing a cellulose-reactive substituent.

A modification of this process can be used for manufacture of the new dyestuffs in which the cellulose-reactive group represented by X is a dichloro-s-triazine group; in the modified process, 1 mole of the phenylene diamine mono- or di-sulphonic acid is condensed with 2 moles of cyanuric chloride and the resultant product is then reacted with 1 mole of the metal complex formazan compound.

The invention also provides a process for the manufacture of the dyestuffs in which X represents a 2-s-triazinyl nucleus containing a chlorine or bromine atom attached to the 4 carbon atom and an amino or substituted amino group attached to the 6 carbon atom which comprises treating a dyestuff of formula (1) in which D and n have the meanings stated above, and X represents a 4,6-dichloro- or dibromo-s-triazin-2-yl group with ammonia or an amine.

This process can conveniently be carried out by stirring the reactants in an aqueous medium at a pH of 5 to 7, and preferably at a temperature of 30° to 50°C, adding an acid binding agent to neutralize the hydrochloric acid liberated during the reaction, or alternatively by employing an excess of ammonia or the amine for this purpose.

The dichloro- or dibromo-s-triazine dyestuff used may be manufactured by any of the process described hereinbefore. If desired, it may be isolated and purified before further reaction but in general this is not necessary and the ammonia or amine can be added to the reaction mixture in which the dichloro- or dibromo-s-triazine dyestuff has been formed.

The new dyestuffs can be isolated from the reaction mixtures in which they have been formed by the usual techniques adopted for isolation of water-soluble reactive dyestuffs, for example, by salting out and filtration, or by spray-drying the reaction mixture in which the dyestuff has been formed. If desired, stabilizers, e.g. alkali metal hydrogen phosphates can be added.

The new reactive dyestuffs are valuable for coloring cellulose textile materials, e.g. textile materials comprising natural or regenerated cellulose such as cotton, linen and viscose rayon. For coloring such materials, the new dyestuffs are preferably applied, either by a printing but preferably a dyeing process to the cellulose textile material in conjunction with a treatment with an acid binding agent, e.g. caustic soda, sodium carbonate, silicate or bicarbonate, which may be applied to the material before, during or after the application of the dyestuff. When so applied the new dyestuffs react with the cellulose and yield a wide variety of shades having excellent fastness to washing and to light; the preferred dyestuffs give bright greenish-blue shades. They are notable for the high proportion which fixes on the material especially when applied from saline dyebaths, or when printing, and for the low degree of staining of adjacent undyed material either whilst washing off unfixed dyestuff after printing or during washing tests.

The invention is illustrated but not limited by the following Examples in which parts are by weight and the ratio w/v is in the ratio of kilogram to litre.

EXAMPLE 1

59.6 Parts of the copper complex of N-(2-hydroxy-5-) sulpho-3-aminophenyl)-N'-(2'-carboxy-4'-sulphophenyl)-msphenylformazan (obtained by coupling diazotized 6-acetylamino-2-aminophenol-4-sulphonic acid with the hydrazone from benzaldehyde and 2-carboxyphenylhydrazine-4-sulphonic acid, coppering and hydrolyzing the acetylamino group with dilute caustic soda) are dissolved in 1,000 parts of water at 25°C. A solution of 56.4 parts of 1,3-bis-(dichlorotriazinyl)-aminobenzene-4,6-disulphonic acid in 1200 parts of water is then added and the mixture is stirred for 3 hours at 25°C, maintaining the pH between 5–7 by the addition of 10 percent aqueous sodium carbonate. The solution is then treated with 20 percent w/v sodium chloride and the precipitated product is filtered off and dried at room temperature under vacuum. The dyestuff is found to contain three atoms of hydrolyzable, chlorine per molecule and when applied to cellulosic materials in the presence of an acid binder at 40°C, bright blue shades with excellent fastness to light and to washing are obtained.

EXAMPLE 2

A solution of 4 parts of cyanuric chloride in 20 parts of acetone is added to a neutral solution of 3.65 parts of metanilic acid in 60 parts of ice-water. The mixture is stirred at 0°–5°C for 2 hours maintaining the pH between 5–7 by the addition of 10 percent sodium carbonate solution. Residual cyanuric chloride is then screened off and a neutral solution of 4.85 parts of 1,4-diaminobenzene-2,5-disulphonic acid in 30 parts of water is added. The mixture is heated to 35°–40°C for 5 hours maintaining the pH between 5–6 by the addition of 10 percent sodium bicarbonate solution. When the condensation is complete the small excess of 2,4-dichloro-6-(3'-sulphoanilino)-s-triazine is removed by adding 2 parts of ammonia solution (specific gravity 0.880) and stirring at 35°–40°C for 2 hours. The pH of the mixture is adjusted to 7 by the addition of hydrochloric acid and the mixture is cooled to 0°–5°C by the addition of ice.

A solution of 3.8 parts of cyanuric chloride in 15 parts of acetone is added and the mixture is stirred at 0°–5°C for 3 hours maintaining the pH between 6–7 by the addition of 10 percent aqueous sodium carbonate. When the condensation is complete residual cyanuric chloride is screened off and a neutral solution of 10.7 parts of the copper complex of N-(2-hydroxy-5-sulpho-3-aminophenyl)-N'-(2'-carboxy-4'-sulphophenyl)-ms-phenylformazan in 100 parts of water is added. The mixture is heated to 35°–40° for 2 hours maintaining the pH between 5–7 by the addition of 10 percent sodium carbonate solution. When the condensation is complete the product is isolated by the addition of 20 percent w/v sodium chloride, filtered off and dried. The dyestuff is found to contain two atoms of hydrolyzable chlorine per molecule and when applied to cellulosic materials in the presence of an acid binder at 80°C, bright blue shades with excellent fastness to light and to washing are obtained.

EXAMPLE 3

1.85 parts of cyanuric chloride are reacted with 1.75 parts of metanilic acid and 1.9 parts of 1,3-diaminobenzene-4-sulphonic acid in a similar manner to Example 2.

Separately, a solution of 1.9 parts of cyanuric chloride in 10 parts of acetone is added to a neutral solution of 5.7 parts of the copper complex of N-(2-hydroxy-5-sulpho-3-aminophenyl)-N'-(2'-carboxy-4'-sulphophenyl)-ms-phenylformazan in 100 parts of ice-water. The mixture is stirred at 0°–5°C for 2 hours, maintaining the pH between 5–7 by the addition of 10 percent aqueous sodium carbonate. Unreacted cyanuric chloride is screened off and the filtrate is added to the solution previously prepared from 1,3-diaminobenzene-4-sulphonic acid, cyanuric chloride and metanilic acid. The mixture is heated to 35°–40°C for 6 hours maintaining the pH between 5–7 by the addition of 10 percent aqueous sodium carbonate. The product is isolated by the addition of 20 percent w/v of sodium chloride, filtered off and dried. The product is found to contain two atoms of hydrolyzable chlorine per molecule and when applied to cellulosic materials in the presence of an acid binder at 80°C, bright blue shades with excellent fastness to light and to washing are obtained.

EXAMPLE 4

A solution of 1.9 parts of cyanuric chloride in 10 parts of acetone is added to a neutral solution of 6 parts of the copper complex of N-(2-hydroxy-5-sulpho-3-aminophenyl)-N'-(2'-carboxy-4'-sulphophenyl)-ms-(4-sulphophenyl)-formazan in 70 parts of ice-water. The mixture is stirred at 0°–5°C for 1 hour maintaining the pH between 5–7 by the gradual addition of 10 percent sodium carbonate solution. Unreacted cyanuric chloride is screened off and a neutral solution of 1.9 parts of 1,3-diaminobenzene-4-sulphonic acid in 15 parts of water is added. The solution is heated to 35°–40° for 4 hours maintaining the pH between 4–4.5 by the addition of 10 percent sodium carbonate solution. The product is precipitated by the addition of sodium chloride (15 percent w/v) and filtered off. The filter cake is redissolved in 150 parts of ice-water and a solution of 2 parts of cyanuric chloride in 10 parts of acetone is added. The mixture is stirred at 0°–5°C for 2 hours maintaining the pH between 6–7 by the addition of 10 percent aqueous sodium carbonate solution. The product is precipitated by the addition of sodium chloride (15 percent w/v) and filtered off. 2 parts of a mixture of 2 parts of potassium dihydrogen orthophosphate and 1 part of disodium hydrogen orthophosphate is mixed into the paste and the product is dried at room temperature under vacuum. The dyestuff is found to contain three atoms of hydrolyzable chlorine per molecule and when applied to cellulosic materials in the presence of an acid binder at 40°C, bright blue shades with excellent fastness to light and to washing are obtained.

EXAMPLE 5

11.2 parts of the product from Example 4 are dissolved in 100 parts of water and a neutral solution of 1.75 parts of metanilic acid in 15 parts of water is added. The mixture is heated to 35°–40°C for 3 hours maintaining the pH between 5–7 by the addition of 10 percent aqueous sodium carbonate. The product in precipitated by the addition of 20 percent w/v sodium chloride, filtered off and dried. The dyestuff is found to contain two atoms of hydrolyzable chlorine per molecule and when applied to cellulosic materials at 80°C in the presence of an acid binder bright blue shades of excellent fastness are obtained.

EXAMPLE 6

102.4 Parts of the product from Example 1 are dissolved in 1,000 parts of water and a solution 17.3 parts of metanilic acid in 200 parts of water are added. The mixture is heated to 35°–40°C for 3 hours maintaining the pH between 5–7 by the addition of 10 percent aqueous sodium carbonate. The product is precipitated by the addition of 20 percent w/v sodium chloride, filtered off and dried. The dyestuff is found to contain two atoms of hydrolyzable chlorine per molecule and when applied to cellulosic materials at 80°C in the presence of an acid binder bright blue shades of excellent fastness are obtained.

The following table describes a number of other examples of dyestuffs of the invention, obtained in a similar manner to Example 2 by reacting cyanuric chloride with the amine of column IV and the diamine of column III, and reacting a further mole of cyanuric chloride successively with the resultant product and with the compound of column II. Alternatively the methods of Examples 5 and 6 may be used, condensing cyanuric chloride with the compounds of columns II and III, and finally reacting with the compound of column IV.

| I | II | III | IV | V |
|---|---|---|---|---|
| 1 | The copper complex of N-(2-hydroxy-5-sulpho-3-aminophenyl)-N'-(2'-carboxy-4'-sulphophenyl)-ms-phenylformazan | 1,4-diaminobenzene-2,5-disulphonic acid | 2-aminotoluene-4-sulphonic acid | Blue |
| 2 | " | " | 2-aminotoluene-5-sulphonic acid | " |
| 3 | " | " | 2-amino-5-sulphobenzoic acid | " |
| 4 | " | 1,3-diaminobenzene-4,6-disulphonic acid | " | " |
| 5 | " | " | sulphanilic acid | " |
| 6 | " | " | 2-aminotoluene-4-sulphonic acid | " |
| 7 | " | " | 2-aminotoluene-5-sulphonic acid | " |
| 8 | " | " | 2-aminotoluene-4,5-disulphonic acid | " |
| 9 | The copper complex of N-(2-hydroxy-5-sulpho-3-aminophenyl)-N'-(2'-carboxy-4'-sulphophenyl)-ms-(4-sulphophenyl)-formazan | 1,4-diaminobenzene-2,5-disulphonic acid | metanilic acid | Reddish-blue |
| 10 | " | " | 2-aminotoluene-4-sulphonic acid | " |
| 11 | " | " | 2-aminotoluene-5-sulphonic acid | " |
| 12 | " | " | 2-amino-5-sulphobenzoic acid | " |
| 13 | " | 1,3-diaminobenzene-4,6-disulphonic acid | metanilic acid | " |
| 14 | " | " | 2-aminotoluene-4-sulphonic acid | " |
| 15 | " | " | ammonia | " |
| 16 | The copper complex of N-(2-hydroxy-5-sulphophenyl)-N'-(2'-carboxy-4'-aminophenyl)-ms-(2-sulphophenyl)-formazan | 1,4-diaminobenzene-2,5-disulphonic acid | metanilic acid | Blue |
| 17 | " | " | 2-aminotoluene-5-sulphonic acid | " |
| 18 | " | 1,3-diaminobenzene-4,6-disulphonic acid | " | " |
| 19 | " | " | metanilic acid | " |
| 20 | The copper complex of N-(2-hydroxy-5-sulphophenyl)-N'-(2'-carboxy-4'-aminophenyl)-ms-(4-sulphophenyl)-formazan | 1,4-diaminobenzene-2,5-disulphonic acid | metanilic acid | Reddish-blue |
| 21 | " | " | 2-aminotoluene-5-sulphonic acid | " |
| 22 | " | " | 2-aminotoluene-4-sulphonic acid | " |
| 23 | " | 1,3-diaminobenzene-4,6-disulphonic acid | ammonia | " |
| 24 | " | " | metanilic acid | " |
| 25 | " | " | 2-aminotoluene-5-sulphonic acid | " |
| 26 | The copper complex of N-(2-hydroxy-5-sulphophenyl)-N'-(2'-carboxy-4'-aminophenyl)-ms-(2-chloro-5-sulphophenyl)-formazan | 1,4-diaminobenzene-2,5-disulphonic acid | ammonia | " |
| 27 | " | " | metanilic acid | " |
| 28 | " | " | aniline | " |
| 29 | " | " | 2-aminotoluene- | " |

-continued

| I | II | III | IV | V |
|---|---|---|---|---|
| 30 | " | 1,3-diaminobenzene-4,6-disulphonic acid | 5-sulphonic acid ammonia | " |
| 31 | " | " | metanilic acid | " |
| 32 | The copper complex of N-(2-hydroxy-5-sulpho-3-aminophenyl)-N'-(2'-carboxy-4'-sulphophenyl)-ms-(2-chloro-5-sulphophenyl)-formazan | 1,4-diaminobenzene-2,5-disulphonic acid | ammonia | Reddish-blue |
| 33 | " | " | metanilic acid | " |
| 34 | " | 1,3-diaminobenzene-4,6-disulphonic acid | ammonia | " |
| 35 | " | " | metanilic acid | " |
| 36 | The copper complex of N-(2-hydroxy-5-sulphophenyl)-N'-(2'-carboxy-4'-sulphophenyl)-ms-(4'-aminophenyl)-formazan | " | " | Blue |
| 37 | The copper complex of N-(2-hydroxy-3,5-disulphophenyl)-N'-(2'-carboxy-4'-sulphophenyl)-ms-(4-aminophenyl)-formazan | 1,4-diaminobenzene-2,5-disulphonic acid | " | " |
| 38 | The copper complex of N-(2-hydroxy-5-sulphophenyl)-N'-(2'-carboxy-4'-sulphophenyl)-ms-(4-amino-2-sulphophenyl)-formazan | " | " | " |
| 39 | The copper complex of N-(2-carboxy-4-aminophenyl)-N'-(2'-hydroxy-4',6'-disulphonaphth-1'-yl)-ms-phenyl formazan | 1,3-diaminobenzene-4,6-disulphonic acid | " | Green |
| 40 | " | 1,4-diaminobenzene-2,5-disulphonic acid | 1-aminobenzene-2,5-disulphonic acid | " |
| 41 | The copper complex of N-(2-carboxy-4-aminophenyl)-N'-(2'-hydroxy-4'-sulphonaphth-1'-yl)-ms-(2-sulphophenyl)formazan | 1,4-diaminobenzene-2,5-disulphonic acid | 1-aminobenzene-2,5-disulphonic acid | Green |
| 42 | The copper complex of N-(2-carboxy-4-aminophenyl)-N'-(2'-hydroxy-3'-chloro-5'-sulphophenyl-ms-(2-sulphophenyl)formazan | 1,3-diaminobenzene-4,6-disulphonic acid | metanilic acid | Blue |
| 43 | " | 1,4-diaminobenzene-2,5-disulphonic acid | 2-amino-5-sulphobenzoic acid | " |

The following Table describes further examples of the invention obtained in a similar manner to Example 2, except that the compound of column IV is used in place of the condensation product of cyanuric chloride and metanilic acid; this compound is condensed with the diamine of column III and cyanuric chloride is condensed successively with the resulting product and with the compound of column II.

Where the compound of column IV is cyanuric chloride, the dyestuff can be made in similar manner to Example 1, i.e. by condensing the diamine of column III with two moles of cyanuric chloride and the resulting product with one mole of the compound of column II.

The dyestuffs, but preferably Examples 36 to 103 of the table can also be made by the process of Examples 3 and 4 i.e. by reacting cyanuric chloride with 1 mole of the compound of column II and 1 mole of the product obtained by condensing the diamine of column III with the compound of column IV; or by condensing the compound of column II with cyanuric chloride, the product with the diamine of column III and the resulting product with the compound of column IV.

| I | U II | III | IV | V |
|---|---|---|---|---|
| 1 | The copper complex of N-(2-hydroxy-5-sulpho-3-aminophenyl)-N'-(2'-carboxy-4'-sulphophenyl)-ms-phenylformazan | 1,4-diaminobenzene-2,5-disulphonic acid | 2,4,6-trichloro-pyrimidine | Blue |
| 2 | " | " | 2,4-dichloropyrimidine-5-carbonyl chloride | " |
| 3 | " | " | 2,4-dichloro-6-methoxy-s-triazine | " |
| 4 | " | " | 2,4,5,6-tetrachloro-pyrimidine | " |
| 5 | " | " | carbyl sulphate | " |
| 6 | " | " | 2,3-dichloroquinoxaline-6-carbonyl chloride | " |
| 7 | The copper complex of N-(2-hydroxy-5-sulpho-3-aminophenyl)-N'-(2'-carboxy-4'-sulphophenyl)-ms-(4-sulphophenyl)formazan | " | 2,4,5,6-tetrachloro-pyrimidine | " |
| 8 | " | " | 2,4,6-trichloro-pyrimidine | " |
| 9 | " | " | cyanuric chloride | " |
| 10 | The copper complex of N-(2-hydroxy-5-sulpho-3-aminophenyl)-N'-(2'-carboxy-4'-sulphophenyl)-ms-(4-sulphophenyl-formazan | 1,4-diaminobenzene-2,5-disulphonic acid | 2,3-dichloroquinoxaline-6-carbonyl chloride | Blue |
| 11 | " | " | carbyl sulphate | " |
| 12 | " | 1,3-diaminobenzene-4,6-disulphonic acid | cyanuric chloride | " |
| 13 | " | " | 2,4-dichloropyrimidine-5-carbonyl chloride | " |
| 14 | " | " | 2,3-dichloroquinoxaline-6-carbonyl chloride | " |
| 15 | The copper complex of N-(2-hydroxy-5-sulphophenyl)-N'-(2'-carboxy-4'-aminophenyl)-ms-(2-sulphophenyl)formazan | 1,4-diaminobenzene-2,5-disulphonic acid | cyanuric chloride | " |
| 16 | " | " | 2,4,5,6-tetrachloro-pyrimidine | " |
| 17 | " | " | carbyl sulphate | " |

| I | II | III | IV | V |
|---|---|---|---|---|
| 18 | " | 1,3-diaminobenzene-4,6-disulphonic acid | " | " |
| 19 | " | " | cyanuric chloride | " |
| 20 | " | " | 2,4,5,6-tetrachloro-pyrimidine | " |
| 21 | The copper complex of N-(2-hydroxy-5-sulpho-phenyl)-N'-(2'-carboxy-4'-aminophenyl)-ms-(2-chloro-5-sulphophenyl)formazan | 1,4-diaminobenzene-2,5-disulphonic acid | 2,4,5,6-tetrachloro-pyrimidine | Reddish-blue |
| 22 | " | " | cyanuric chloride | " |
| 23 | " | " | β-chloropropionic acid chloride | " |
| 24 | " | " | carbyl sulphate | " |
| 25 | " | 1,3-diaminobenzene-4,6-disulphonic acid | " | " |
| 26 | " | " | 2,4,5,6-tetrachloro-pyrimidine | " |
| 27 | The copper complex of N-(2-hydroxy-5-sulpho-phenyl)-N'-(2'-carboxy-4'-sulphophenyl)-ms-(4'-aminophenyl)formazan | 1,4-diaminobenzene-2,5-disulphonic acid | cyanuric chloride | Blue |
| 28 | " | " | 2,4,5,6-tetrachloro-pyrimidine | " |
| 29 | The copper complex of N-(2-hydroxy-5-sulpho-phenyl)-N'-(2'-carboxy-4'-sulphophenyl)-ms-(4-amino-2-sulphophenyl)-formazan | " | " | " |
| 30 | " | " | cyanuric chloride | " |
| 31 | The copper complex of N-(2-hydroxy-3-chloro-5-sulphophenyl)-N'-(2'-carboxy-4'-amino-phenyl)-ms-(2-sulphophenyl)formazan | 1,4-diaminobenzene-2,5-disulphonic acid | cyanuric chloride | Blue |
| 32 | " | " | 2,4,5,6-tetrachloro-pyrimidine | " |
| 33 | " | 1,3-diaminobenzene-4,6-disulphonic acid | 2,4-dichloro-6-(3'-sulphoanilino)-s-triazine | " |
| 34 | The copper complex of N-(2-carboxy-4-amino-phenyl)-N'-(2'-hydroxy-4'-sulphonaphth-1-yl)-ms-(2-sulphophenyl)formazan | " | " | Green |
| 35 | " | 1,4-diaminobenzene-2,5-disulphonic acid | 2,4-dichloro-6-(2',5'-disulphoanilino)-s-triazine | " |
| 36 | The copper complex of N-(2-hydroxy-5-sulpho-3-aminophenyl)-N'-(2'-carboxy-4'-sulpho-phenyl)-ms-phenylformazan | 1,4-diaminobenzene 2-sulphonic acid | 2,4-dichloro-6-(2'-carboxy-4'-sulpho-anilino)-s-triazine | Blue |
| 37 | " | " | 2,4-dichloro-6-(2'-carboxy-5'-sulpho-anilino)-s-triazine | " |
| 38 | " | " | 2,4-dichloro-6-(2'-methyl-4',5'-disulpho-anilino)-s-triazine | " |
| 39 | The copper complex of N-(2-hydroxy-5-sulpho-3-aminophenyl)-N'-(2'-carboxy-4'-sulpho-phenyl)-ms-phenylformazan | 1,3-diaminobenzene-4-sulphonic acid | cyanuric chloride | Blue |
| 40 | " | " | 2,4-dichloro-6-methoxy-s-triazine | " |
| 41 | " | " | 2,4,5,6-tetrachloro-pyrimidine | " |
| 42 | " | " | 2-amino-4,6-dichloro-s-triazine | " |
| 43 | " | " | 2,4-dichloro-6-(2'-methyl-5'-sulpho-anilino)-s-triazine | " |
| 44 | " | " | 2,4-dichloro-6-(2'-methyl-4',5'-disulpho-anilino)-s-triazine | " |
| 45 | " | " | 2,4-dichloropyrimidine-5-carbonyl chloride | " |
| 46 | The copper complex of N-(2-hydroxy-5-sulpho-3-aminophenyl)-N'-(2'-carboxy-4'-sulpho-phenyl)-ms-(4-sulphophenyl)formazan | 1,4-diaminobenzene-2-sulphonic acid | 2,4-dichloro-6-(3'-sulphoanilino)-s-triazine | " |
| 47 | The copper complex of N-(2-hydroxy-5-sulpho-3-aminophenyl)-N'-(2'-carboxy-4'-sulpho-phenyl)-ms-(4-sulphophenyl)formazan | 1,4-diaminobenzene-2-sulphonic acid | 2,4-dichloro-6-(2'-methyl-5'-sulpho-anilino)-s-triazine | Blue |
| 48 | " | " | 2,4-dichloro-6-(2',5'-disulphoanilino)-s-triazine | " |
| 49 | " | " | 2,4,5,6-tetrachloro-pyrimidine | " |
| 50 | " | " | cyanuric chloride | " |
| 51 | " | 1,3-diaminobenzene-4-sulphonic acid | " | " |
| 52 | " | " | 2-amino-4,6-dichloro-s-triazine | " |
| 53 | " | " | 2,4-dichloro-6-methoxy-s-triazine | " |
| 54 | " | " | 2,4-dichloro-6-(3'-sulphoanilino)-s-triazine | " |
| 55 | " | " | 2,4,5,6-tetrachloro-pyrimidine | " |
| 56 | The copper complex of N-(2-hydroxy-5-sulpho-phenyl)-N'-(2'-carboxy-4'-aminophenyl)-ms-(2-sulphophenyl)-formazan | 1,4-diaminobenzene-2-sulphonic acid | 2,4-dichloro-6-amino-s-triazine | Blue |

-continued

| I | II | III | IV | V |
|---|---|---|---|---|
| 57 | " | " | 2,4-dichloro-6-anilino-s-triazine | " |
| 58 | " | " | 2,4-dichloro-6-(3'-sulphoanilino)-s-triazine | " |
| 59 | " | " | cyanuric chloride | " |
| 60 | " | " | 2,4,5,6-tetrachloropyrimidine | " |
| 61 | " | " | carbyl sulphate | " |
| 62 | " | " | 2,3-dichloroquinoxaline-6-carbonyl chloride | " |
| 63 | " | " | 2,4-dichloro-6-(2'-carboxyanilino)-s-triazine | " |
| 64 | " | 1,3-diaminobenzene-4-sulphonic acid | " | " |
| 65 | " | " | 2,4,5,6-tetrachloropyrimidine | " |
| 66 | The copper complex of N-(2-hydroxy-5-sulphophenyl)-N'-(2'-carboxy-4'-aminophenyl)-ms-(2-sulphophenyl)-formazan | 1,3-diaminobenzene-4-sulphonic acid | 2,4-dichloro-6-isopropoxy-s-triazine | Blue |
| 67 | " | " | 2,4-dichloro-6-(2'-methyl-5'-sulphoanilino)-s-triazine | " |
| 68 | The copper complex of N-(2-hydroxy-3,5-disulphophenyl)-N'-(2'-carboxy-4'-aminophenyl)-ms-(2-sulphophenyl)-formazan | 1,4-diaminobenzene-2-sulphonic acid | 2,4-dichloro-6-(2',5'-disulphoanilino)-s-triazine | " |
| 69 | " | " | cyanuric chloride | " |
| 70 | " | " | 2,4-dichloro-6-(3'-sulphoanilino)-s-triazine | " |
| 71 | " | " | 2,4-dichloro-6-methoxy-s-triazine | " |
| 72 | " | " | 2,4-dichloro-6-amino-s-triazine | " |
| 73 | " | " | 2,4,5,6-tetrachloropyrimidine | " |
| 74 | " | 1,3-diaminobenzene-4-sulphonic acid | " | " |
| 75 | The copper complex of N-(2-hydroxy-3,5-disulphophenyl)-N'-(2'-carboxy-4'-aminophenyl)-ms-(2-sulphophenyl)-formazan | 1,3-diaminobenzene-4-sulphonic acid | cyanuric chloride | Blue |
| 76 | " | " | 2,4-dichloro-6-methoxy-s-triazine | " |
| 77 | " | " | 2,4-dichloro-6-(3'-sulphoanilino)-s-triazine | " |
| 78 | The copper complex of N-(2-hydroxy-3,5-disulphophenyl)-N'-(2'-carboxy-4'-sulphophenyl)-ms-(4-aminophenyl)-formazan | 1,4-diaminobenzene-2-sulphonic acid | cyanuric chloride | " |
| 79 | " | " | 2,4-dichloro-6-(3'-sulphoanilino)-s-triazine | " |
| 80 | " | " | 2,4-dichloro-6-anilino-s-triazine | " |
| 81 | " | " | 2,4,5,6-tetrachloropyrimidine | " |
| 82 | " | 1,3-diaminobenzene-4-sulphonic acid | cyanuric chloride | " |
| 83 | The copper complex of N-(2-hydroxy-3,5-disulphophenyl)-N'-(2'-carboxy-4'-sulphophenyl)-ms-(4-aminophenyl)-formazan | 1,3-diaminobenzene-4-sulphonic acid | 2,4-dichloro-6-amino-s-triazine | Blue |
| 84 | " | " | 2,4-dichloro-6-(2'-methyl-5'-sulphoanilino)-s-triazine | " |
| 85 | " | " | 2,4,5,6-tetrachloropyrimidine | " |
| 86 | The copper complex of N-(2-hydroxy-5-sulphophenyl)-N'-(2'-carboxy-4'-sulphophenyl)-ms-(4-amino-2-sulphophenyl)-formazan | 1,4-diaminobenzene-2-sulphonic acid | cyanuric chloride | " |
| 87 | " | " | 2,4-dichloro-6-amino-s-triazine | " |
| 88 | " | " | 2,4-dichloro-6-methoxy-s-triazine | " |
| 89 | " | " | 2,4,5,6-tetrachloropyrimidine | " |
| 90 | " | " | 2,4-dichloro-6-(3'-sulphoanilino)-s-triazine | " |
| 91 | The copper complex of N-(2-hydroxy-5-sulphophenyl)-N'-(2'-carboxy-4'-sulphophenyl)-ms-(4-amino-2-sulphophenyl)-formazan | 1,3-diaminobenzene-4-sulphonic acid | cyanuric chloride | Blue |
| 92 | " | " | 2,4,5,6-tetrachloropyrimidine | " |
| 93 | " | " | 2,4-dichloro-6-(2'-methyl-4'-sulphoanilino)-s-triazine | " |
| 94 | " | " | 2,4-dichloro-6-anilino-s-triazine | " |
| 95 | The copper complex of N-(2-carboxy-4-aminophenyl)-N'-(2'-hydroxy-4',6'-disulphonaphth | " | 2,4-dichloro-6-(2'-methyl-5'-sulpho- | Green |

-continued

| I | U II | III | IV | V |
|---|---|---|---|---|
| | 1'-yl)-ms-(4-sulphophenyl)-formazan | | anilino)-s-triazine | |
| 96 | " | 1,4-diaminobenzene-2-sulphonic acid | 2,4-dichloro-6-(2',5'-disulphoanilino)-s-triazine | " |
| 97 | The copper complex of N-(2-carboxy-4-aminophenyl)-N'-(2'-hydroxy-4'-sulphonaphth-1'-yl)-ms-(2-sulphophenyl)-formazan | 1,3-diaminobenzene-4-sulphonic acid | cyanuric chloride | " |
| 98 | " | " | 2,4-dichloro-6-(2',5'-disulphoanilino)-s-triazine | " |
| 99 | The copper complex of N-(2-carboxy-4-aminophenyl)-N'-(2'-hydroxy-4'-sulphonaphth-1'-yl)-ms-(2-sulphophenyl)-formazan | 1,4-diaminobenzene-2-sulphonic acid | 2,4-dichloro-6-(2',5'-disulphoanilino)-s-triazine | Green |
| 100 | The copper complex of N-(2-carboxy-4-aminophenyl)-N'-(2'-hydroxy-3'-chloro-5'-sulphophenyl)-ms-(2,4-disulphophenyl)-formazan | " | " | Blue |
| 101 | " | 1,3-diaminobenzene-4-sulphonic acid | 2,4-dichloro-6-(2'-methyl-5'-sulphoanilino)-s-triazine | " |
| 102 | " | " | cyanuric chloride | " |
| 103 | " | " | 2,4,5,6-tetrachloropyrimidine | " |

Referring to the second table, many of the dyestuffs can also be made as in Example 5 or Example 6; the diamine of column III is reacted with 2 moles of cyanuric chloride and the product successively with the compound of column II and the appropriate amine; or cyanuric chloride is condensed with the compound of column II and the diamine of column II and the product is condensed with cyanuric chloride and the appropriate amine. The amines used are as follows:

| Amine | Examples |
|---|---|
| metanilic acid | 33, 34, 46, 54, 58, 70, 77, 79, 90 |
| aniline-2,5-disulphonic acid | 35, 48, 68, 96, 98, 99, 100 |
| 4-sulpho-2-carboxyaniline | 36 |
| 5-sulpho-2-carboxyaniline | 37 |
| 2-methyl-4,5-disulphoaniline | 38, 44, 84 |
| ammonia | 42, 52, 56, 72, 83, 87 |
| 5-sulpho-2-methylaniline | 43, 47, 67, 95, 101 |
| aniline | 57, 80, 94 |
| 4-sulpho-2-methylaniline | 93 |

We claim:
1. A dyestuff having the formula

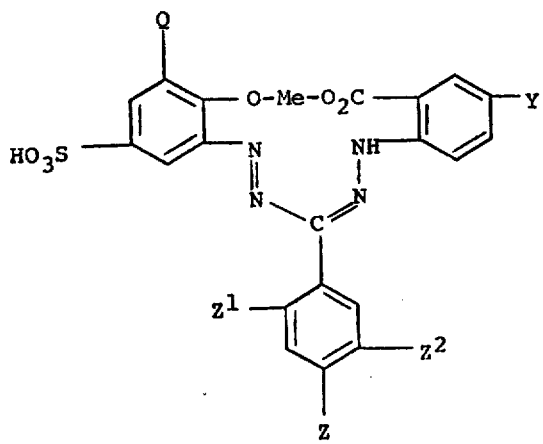

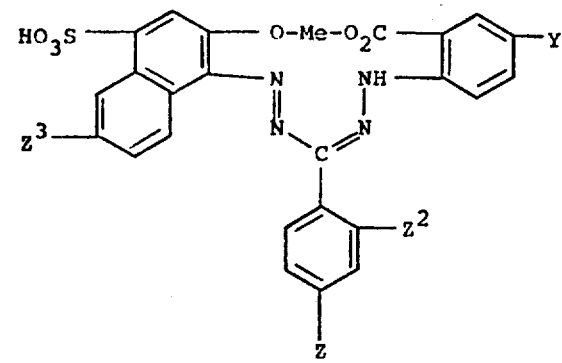

wherein one of Q, Y and Z is

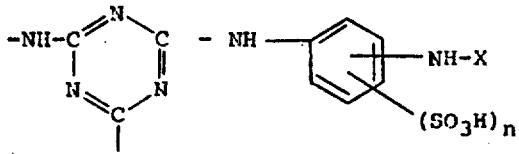

wherein $n$ is 1 or 2 and X is $\beta$-sulphatoethylsulphonyl, 2,4-dichloropyrimid-6-yl, 2,4,5-trichloropyrimid-6-yl, 2,4-dichloropyrimid-5-yl carbonyl, 2,3-dichloroquinoxalin-6-yl carbonyl, $\beta$-chloropropionyl or

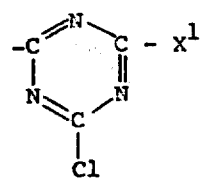

wherein $X^1$ is Cl, $OCH_3$, $OCH(CH_3)_2$, $NH_2$,

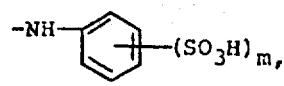

or

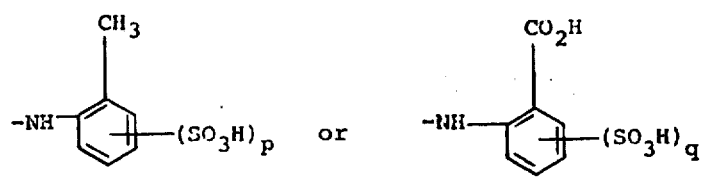

wherein $m$ is 0, 1 or 2, $p$ is 1 or 2 and $q$ is 0 or 1, Q otherwise being H, Cl or $SO_3H$, Y otherwise being $SO_3H$ and Z otherwise being H or $SO_3H$, $Z^1$ is H, Cl or $SO_3H$, $Z^2$ is H or $SO_3H$, $Z^3$ is H or $SO_3H$ and Me is copper, nickel, cobalt or chromium.

2. The dyestuff of claim 1 wherein Me is copper.

3. A dyestuff as claimed in claim 1 having the formula:

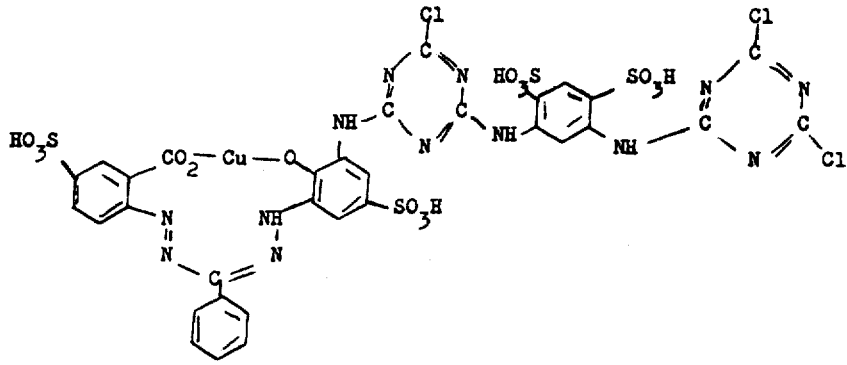

4. A dyestuff as claimed in claim 1 having the formula:

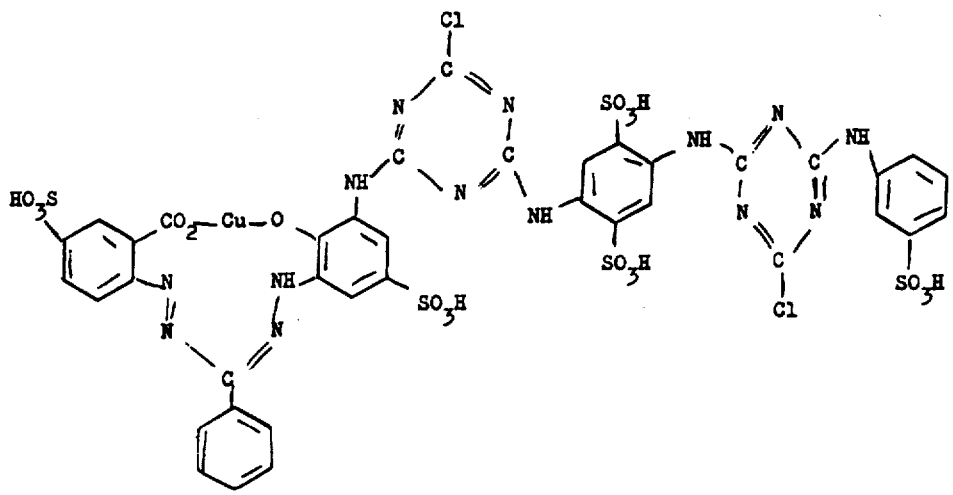

5. A dyestuff as claimed in claim 1 having the formula:

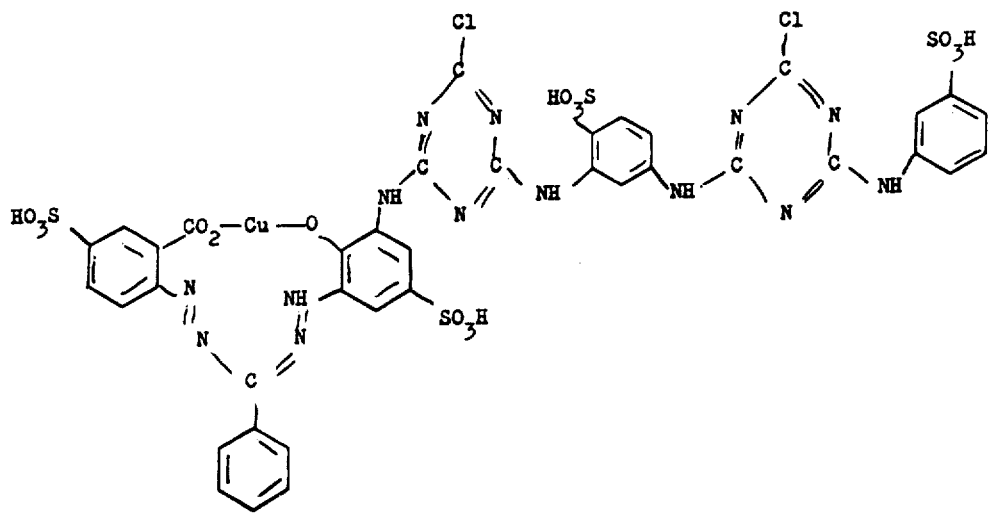

6. A dyestuff as claimed in claim 1 having the formula:
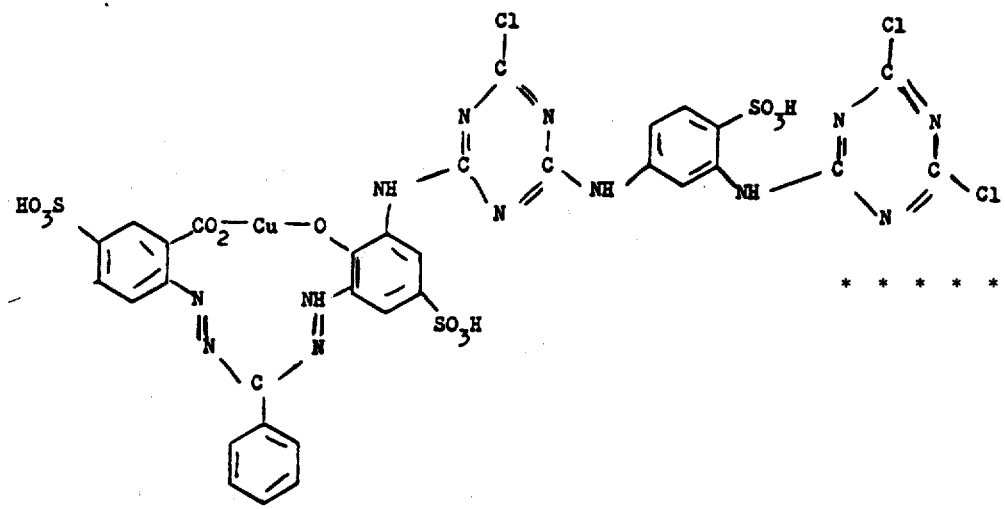
* * * * *